United States Patent [19]

Weintraub et al.

[11] 4,301,542

[45] Nov. 17, 1981

[54] REMOTE CONTROL OF APPLIANCES

[76] Inventors: Morton Weintraub, 1542 47th St.;
Elliot Waxman, 1825 50th St.;
Bernard Gendelman, 1340 52nd St.,
all of Brooklyn, N.Y. 11219

[21] Appl. No.: 27,275

[22] Filed: Apr. 5, 1979

Related U.S. Application Data

[63] Continuation-in-part of Ser. No. 911,168, May 31, 1978, abandoned, which is a continuation-in-part of Ser. No. 707,855, Jul. 22, 1976, abandoned.

[51] Int. Cl.³ .............................................. H04B 1/16
[52] U.S. Cl. .................................................... 455/353
[58] Field of Search ............................ 455/352, 353; 358/194.1; 318/16

[56] References Cited

U.S. PATENT DOCUMENTS 4,047,227 9/1977 Rzeszewski ..................... 358/194

Primary Examiner—Robert L. Richardson

[57] ABSTRACT

This invention relates to the remote wireless control of electrical AC and/or DC appliances, devices, apparatus without relay attachments to the appliance or to the motor driving the appliance or device or modification to the appliance or device. The level of operation of devices may further be controlled remotely, wirelessly, via amplitude modulation, phase, or pulse, or by increasing or decreasing frequency. Motor speed may further be controlled by a beam of visible or invisible light, or by preprogrammed signal eminating from a tape recording or other programmed material. The operation of one or more devices may be also varied automatically remotely, wirelessly, in or out of sequential order.

12 Claims, 2 Drawing Figures

REMOTE CONTROL OF APPLIANCES

This is a continuation-in-part of the copending application Ser. No. 911,168, 5/3/78 which is a continuation in part of Ser. No. 707,855 filed 7/22/76, both now abandoned.

BACKGROUND OF THE INVENTION

1. This invention relates to the control or varying signals that control or vary the operation chiefly of motor driven devices, AC and/or DC. Signals are created, as a first step, to desired amplitude, frequency, phase, or baseband combination. They are further modulated and controlled or changed and transmitted. The received signal is amplified, demodulated and channeled for controlling desired functions from among many functions.

DESCRIPTION OF PRIOR ART

2. Remote controls found in prior art is such that the part of the apparatus to be controlled (or changed as to position) remotely via a motor is the same part that would ordinarily be controlled or changed manually if the remote control apparatus had not been connected.

Hence, changes to be executed by remote controls operate whereby the signals from the remote control apparatus changes or enables relays or other mechanical structure that will enable or change the level of operation (speed for example) of a motor, with the relay situated close by to the motor whereby the object causing the change is connected to the motor or disconnected from it.

For example, if we would want an operating selection of 30, 40, 60, cycles for a motor, we would have to create a power supply of 30, 40, 60, cycles in addition to supplying current via a variable control. Relays would connect the motor to different cycles controlling the motor by the different cycles, with the relays being controlled remotely by the remote control apparatus of prior art.

BACKGROUND OF THE INVENTION

In previous patent applications Ser. No. 707,855 and continuation-in-part thereof Ser. No. 911,168 we have shown that the remote control of radio and television receivers does not require a motor for controlling tuning, channel selection and other receiver functions. It is thus our objective to extend this method and providing one apparatus that would provide remote wireless control of any electrical (and non electrical) apparatus or device, AC or DC without modifying the apparatus or device in any way or without direct hook up to the operating motor.

Another object of this invention is to provide a remote wireless control apparatus that may operate a motor from different inputs to it from different sections.

Another object of this invention is to provide a remote control apparatus that consists of only two components and is comparatively inexpensive; one that would permit control of small as well as large apparatus, since it provides amplification means permitting the amplifcation of very small signals to provide signals of desired amplitude, phase or frequency Another object of this invention is to provide a remote wireless control of motor speed (for example) by a beam of visible or invisible light or via programmed tapes or programmed material.

Other objectives will become apparent during the course of this disclosure:

FIG. 1 is a block diagram of the remote control transmitter-receiver for controlling FIG. 2 remotely, wirelessly.

FIG. 2 comprises the receiver of the transmitted signals of FIG. 1 and controlling any electrical AC/DC device or appliance connected to it.

DESCRIPTION OF THE PREFERRED EMBODIMENT

Figure 1:
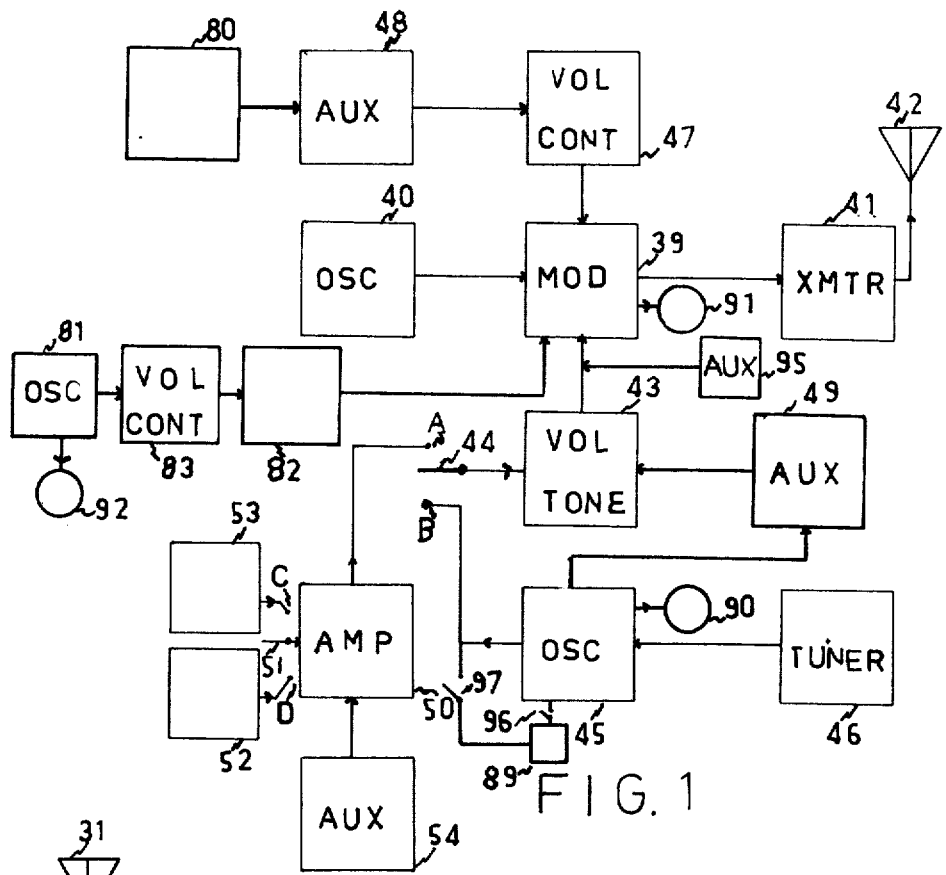

FIG. 1: Oscillator 45 (which in our example is tuned to a 60 cycle signal) or a signal generator generating a 60 cycle signal in conjunction with tuner 46 creates the 60 cycle signal that is fed via switch 44 when in position B to volume control 43 controlling the signal oscillation and then to modulator 39 which modulates the signal of oscillator 40 (carrier frequency). The modulated signal is fed to transmitter 41 and to antenna 42 to air.

The transmitted signal is received via antenna 31 (FIG. 2) and is fed to radio frequency amplifier 30 which is tuned to the the signal of transmitter 41. The RF signal is amplified by amplifier 30 and fed to mixer-oscillator 29 creating an IF signal. The IF signal is amplified once by IF implifier 28 and again by IF amplifier 27 and demodulated by demodulator 26 providing a demodulated baseband signal (of 60 cycles in our example).

The signal is fed to variable resistor 20 which is connected at one side to emitter of transistor 11 and to the output of demodulator 26 from the other side, thus adjusting the signal stemming from the demodulator 26 via capacitor 19. Resistor 18 is connected to the base and collector of transistor 11, while resistor 16 is connected from the emitter to power supply. Resistors 16,18 create the bias of transistor 11. Capacitor 17 is a filter capacitor. The collector of transistor 11 is connected to power supply via coil 10.

All amplified signals of transistor 111 are fed from the transormer's primary coil 10 to its secondary coil 9 whereby the signal is fed to the base of transistor 5,6. A high powered signal is then fed to primary coil 4 and to secondary coils 2,3. The emitters of transistors 5,6 are joined to wire 38 receiving current from DC power supply 14. The collectors of transistors 5,6 is connected to coil 4, while center tap 37 connects to power supply 14, hence completing the circuit via transistors 5,6.

Resistors 7,8 serve to bias transistors 5,6 since they are joined to the center tap of coil 9, resistor 7 connects to emitter while resistor 8 connects to power supply and to center tap 37. Capacitor 17 connects to coil 10 and to emitter of transistor 11.

For the sake of practicality, DC power supply or rectifier 14 supplies 110 volts DC so that with little oscillation of a signal in coil 4 we would get a strong signal at coils 2 and 3. Hovever, should power supply 14 be such that it supplies low voltage, coils 2,3 would fill the gap by acting as a step up transformer.

A small voltage signal at input capacitor 19 creates a 110 voltage AC or DC at the output of coils 2 or 3. The small voltage signal (or even a fraction of a volt) at input capacitor 19 may either eminate from an oscillator signal connected to capacitor 19 via variable resistor 20 or it may come remotely.

Tiny signals at variable resistor 20 end up as huge signals. Similarly small signals can be changed to huge signals so as to drive any kind of apparatus. Hence, a user may drive a motor remotely, faster by increasing the signal to it, while supplying a weaker signal will reduce motor speed or bring it to a full stop. Therefore, any apparatus or device operating on a spesific signal, for example a motor (or relay) designed to operate on a special pulse signal, this special signal would then be created in the transmitter by the signal creator 45 in conjunction with 46 thereby having full control over the said connected apparatus (or relay) and the user having the means of changing same to any desired variation.

Volume control 43 increases or decreases the signal fed to it resulting thereby in a corresponding increase or decrease of speed in motor 1. Motor speed may also be increased or decreased by increasing or decreasing the cycles (without reducing amplitude) upon which the motor operates. This is provided by tuner 46 whereby adjusting the tuner 46 will increase or decrease cycles to increase or decrease motor speed—yet tuner 46 may be tuned so as to create 300 cycles at motor 1 whereby motor 1 would greatly slow down with increasing frequency above 60 cycles, its normal mode of operation.

Figure 2:
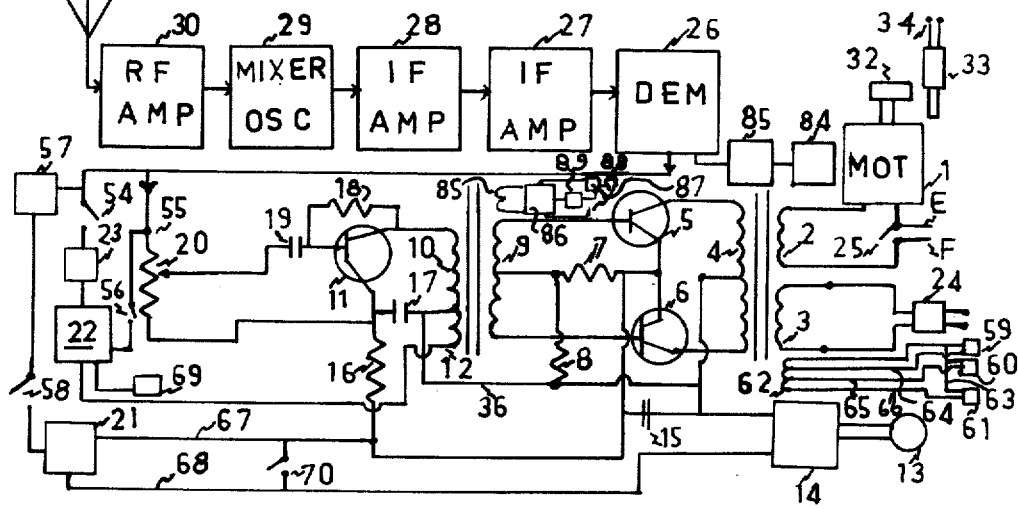

Motor 1 may further be controlled by volume control 47 whereby the signal of oscillator 40 which may be increased or decreased controls the amplitude of the signal sent wirelessly via transmitter 41 to air to FIG. 2 through stages to motor 1.

Auxiliary 49 may serve to control the speed of motor 1 automatically via a small DC generator 33 rotated by wheel 32 attached to the shaft of motor 1, creating thereby a DC output at terminals 34. The output at 34 may either be fed by wire or remotely controlled, to auxiliary 49. When connected by wire, this would cause an increase or decrease to the (60cycle) signal of oscillator 45 passing into modulator 39 via volume control 43 thereby increasing or decreasing the speed of motor 1. If motor 1 for some reason runs too fast, it will result in a generation of a higher DC level at 34 reducing thereby the signal at volume control 43. This can be accomplished via solid state circuitry—reducing thereby the signal from oscillator 45 to modulator 39 hence, reducing speed of motor 1. However, if the speed of motor 1 is reduced for some reason, the output of 34 would likewise be reduced, hence serving to increase the signal at volume control 43, and at oscillator 45 and modulator 39, increasing thereby the speed of motor 1.

Auxiliary 48 serves to achieve the operation described for that of auxiliary 49 when the output of terminals 34 is connected to the output of auxiliary 48 through a second remote control apparatus whereby the second remote control apparatus would transmit a signal similar to that of oscillator 40 and whereby a radio receiver 80 connecting its output to auxiliary 48 thus feeding a similar signal such that of oscillator 40 to volume control 47 and said remote signal being controlled from a remote area. Basically, auxiliary 48 could be controlled by another remote control unit, hence rendering figure 1 a receiver-transmitter remote control unit while auxiliary 49 is usually used for connection of an actually wired (or wireless) baseband signal.

It should be noted that motor 1 may further be controlled remotely by a phased 60 cycle signal by switching switch 44 to position A and using a 60 cycle signal. This would connect amplifier 50 which is capable of receiving and amplifying any signal transmitted to it. When switch 51 is switched to D position, pick up coil 52 set near a transformer would pick up the 60 cycle signal and feed it to amplifier 50, amplifying the 60 cycle signal and feeding it to stages 43,39,41,42 and to air space on to FIG. 2. Note that oscillator 45 is removed when switch 44 is in position A.

Note also that motor 1 may further be controlled via switch 51 by switching switch 51 to position C, whereby light sensitive cell (LSC) 53 would feed any light input to amplifier 50 serving to increase or decrease via volume control 43 the speed of motor 1 or another apparatus in place of 1 by the same signal of the 60 cycle signal. Hence, a light plugged into a 60 cycle outlet beamed at LSC 53 controls the speed wirelessly, remotely of motor 1, whereby increasing or decreasing the light intensity would change the speed of motor 1. Note the signal of the oscillator would not be required when using stage 53 in conjunction with a light.

Auxiliary 54 may be used to control the speed of motor 1 via tape recorded signals or through other programmed means. For example, the output of a tape recorder playing a tape recording of a signal whereby the frequencies and duration of same would be varied. When the signal is fed into auxiliary 54 it will control the speed and the duration of speed of motor 1. Signals that would start or stop the motor may also be recorded. In operation, the control signal is fed to modulator 39 and transmitted via transmitter 41; received from air by antenna 31 of FIG. 2 wherein it is tuned, demodulated and amplified to a signal powerful enough to control motor 1's speed and setting motor 1 on/off relay 21 is provided so as to turn power amplifier on/off, relay 21 receiving its signal from DC amplifier 57 via switch 58. With a DC voltage present from signal of demodulator 26, relay 21 turns power on by connecting wires 67,68 and turns off when signal disappears from stage 26.

Another way of operating the system is whereby switch 25 (FIG. 2) is switched open and a house current input connects to terminals E, F. AC input would be fed in series with coil 2. A reverse (out of phase) signal entering LSC 53 or pick up coil 52 passing to coil 2 will cancel the input at terminals E, F.

The automatic take over of signal is provided, if desired, by DC amplifier 23, which when enabled by manually controlled switch 54 and 56 will feed a baseband signal stemming from demodulator 26 to DC amplifier 23 holding relay 22 open so that coil 12 will not be connected to variable resistor's 20 input via switch 56. When the baseband signal disappears from 23 oscillator relay 22 causes a signal stemming from coil 12 via transistor 11, creating thereby a 60 cycle signal via coil 10. Note that the above stages would take over automatically if transmitter 41 (FIG. 1) should become inoperative. If the connecting function of relay 22 is not desired, switch 56 would open the circuit.

DC amplifier 57 provides an automatic power shut off when FIG. 1 is not in use as DC amplifier 57 amplifies the signal of amplifier 50 or other signals stemming from auxiliary inputs and/or if desired, the DC signal stemming from the demodulated IF signal. When a signal is present at the output of amplifier 57 on/off relay 21 keeps the circuit connected. When the signal entering amplifier 57 is lowered so low that it has no affect on motor 1, then DC amplifier 57 would cause relay 21 to open the power circuit, closing thereby automatically amplifier stages 11,5,6. Switch 58 is switched to open while switch 70 is set to close the circuit to disconnect function of automatic shut off 21.

It should be noted that generally 110 volts DC is used, since it is a simple conversion from 110 volts AC.

However, step up or step down transfomers may be used whereby a tape recorder, for example, operating at 9 volts DC may be operated off coil 3 or whereby connecting coils 2, 3 in series would give us an output of 220 volts AC or DC as desired.

By using FIGS. 1 and 2 in conjunction with our remote control unit as described in patent application Ser. No. 911,162 and continuation-in-part application thereof Ser. No. 911,168 would result in remote wireless control of radio, television, tape recorders or any other audio an and/or video recording apparatus, whereby a recorder speed would be controlled by coil 2 which may be 2 volts, 10 volts or any other desired voltage. Hence, a person remotely located from a record player or tape recorder may even control the music beat (faster or slower) by adjusting volume control 43 in addition to controlling other receiver functions.

Electric apparatus that operate by consecutive order switching, for example, a tape recorder operating only when record then play functions are enabled would operate off relays 59, 60, 61. Understandably, additional relays or solid state circuitry may be added to provide for additional functions.

In operation, the output signal of coil 62 stems from that of coil 4, whereas when the output signal of coil 4 is high, so will be the output signal of coil 62. Coil wire 63 is the common connection to one side of relays 59,60,61. As the voltage eminates from coil 62 3 volts, for example will eminate at wires 64,65,66. The lowest voltage will be at wire 64, a higher voltage will be at wire 65 and an even higher voltage at wire 66. Relays 59, 60, 61, all being 15 volt relays, hence, when volume control 43 is increased, relay 61 will receive 15 volts first via wires 63, 66, triggering relay 61 controlling the record operation first. As volume control 43 is increased further this would feed increased voltage via wires 65,63 hence activating relay 60 to enable the play operation selenoid connected to it while disconnecting relay 61 as it is connected in series over its switch.

When the user further increases volume control 43, enabling relay 59 while disconnecting relay 60. When the volume control is turned down this would disconnect relay 59 and connect relay 61, so that only 15 volts will remain between wires 63 and 66.

When simultaneous activation of two or more relays are desired one of said relays could be made to activate the others.

Hence, numerous apparatus may be connected to numerous relays such as that of 59–61 whereas all relays put on or off or otherwise control in sequential order or any other order arrangement.

It should be noted that subcarrier modulators may be used to transmit a separate signal for a separate channel amplifier. Hence, FIGS. 1, 2 may be used whereby it provides amplitude, frequency or phase variations of radio signals whereby instead of the 60 cycle signal passing directly to modulator 39 via volume control 43, 60 cycle oscillator 45 would modulate another carrier (frequency or amplititude) which in turn would be modulated by modulator 39 as shown by stages oscillator 81, subcarrier modulator 82, volume control 83 in FIG. 1 and subcarrier 85, amplifier 84 FIG. 2.

The remote control apparatus described herein may also be operated as a keyed system whereby relays 59–61 are used as a dialing system to set the motor in operation. The relays may be selected for their voltage. If a different (total) voltage is used motor 1 will not start.

It should be noted that with different voltage coils to relays 59–61 relays 59–61 can also operate when connected to the single AC coil 2 or DC output terminals of rectifier 24, however, greater selectivity may be had when connecting same to coil 62 as described above. Note also, relays 59–61 may be made so as to react to given frequencies, whereby, relay 59 react one frequency while 60, 61 react to others. Therefore, function selectivity may be achieved by relays by changing the baseband signal.

Transmitter 41 may be controlled by another transmitter of a second remote control unit such as that of FIG. 1, if desired, whereby the second unit would be plugged into auxiliary 48 and feeding its own created signal (created by its own oscillator 40 e.g.) hence, controlling the speed of motor 1 from a remote area—even beyond the transmission range of the first remote control unit—via volume control 47, feeding its signal to modulator 39.

Switch 44 controls both the inputs of inputs A, B and baseband signals eminating from auxiliary 49 via volume control 43.

Motor 1 may also be controlled via pick up coil 52 and volume control 43 whereby pick up coil 52 placed near an inductor would feed the signal to amplifier 50 through stages as described.

It should be noted that when switch 54,56 are closed to pass a signal, a set oscillating signal may take over operations of motor 1 if remote control operations (FIG. 1) are not desired. A feedback signal stemming from coil 12 (FIG. 2) would then feed a signal to connection 55 hence, feeding an adjustable signal through variable resistor 20 to transistor 11 causing it to oscillate, feeding its output to coils 2, 3 driving motor 1. Auxiliary 69 provides the means of disconnecting the oscillating signal and feeding in any baseband or recorded signal via auxiliary controlling motor 1 or other apparatus in place of motor 1.

By adapting a duplication of parts 20, 17, 18, 11, 10, 17, 16 12, 8,7,3, 38, 5,6, 4, 2, 3, 14, 15, 24, in square 84 and connecting input to 84 to the subcarrier demodulator 85 thereby having a second control means by a subcarrier signal controlling a second motor and/or having a signal to reverse motor 1 through a reverse winding in motor 1 or to feed a reverse DC polarity to a motor connected to AC to DC conversion means 24.

It should be noted that FIG. 2 of the present invention may operate in conjunction with FIG. 1 of Ser. Nos. 911,162 and 911,168 whereby the signal stemming from auxiliary 10 (FIG. 1) is received by FIG. 2 via its antenna driving motor 1 in FIG. 2 Also, increases and decreases in the signal would be accomplished by volume control 13 (FIG. 1). The same holds true for FIG. 2 in Ser. No. 911,168 whereby a signal stemming from auxiliary 152 would drive motor 1 (FIG. 2), with volume control 153 (FIG. 1) increasing or decreasing the signal. Motor 1 may be used in the last example to drive a zoom or telescopic lense so as to change views. Note that the signal of auxiliary 152 would not interfere with the picture signal, since it is on a subcarrier of the sound signal. After the adjustment, switch 156 in FIG. 2 Ser. No. (911,168) would be switched back to sound control 95.

Note also, that FIG. 2 of the present application can operate in conjunction with all the transmitters of the figures of applications Ser. Nos. 911,162 and 911,168. The only adjustment required in FIG. 2 of this application is the tuning of stages 30 and 29 to receive the transmitted signals of the desired transmission.

For example, if a user desires to operate FIG. 2 of this application in conjunction with FIG. 1 of application Ser. Nos. 911,162 and 911,168 he would tune stages 30, 29 of FIG. 2 to receive the signal of the transmitter of FIG. 1.

Numerous appliances besides motors may be also controlled remotely. For example, a light bulb, in lieu of motor 1. For internal control, switch 44 would be switched to B position. Tuner 46 in conjunction with oscillator 45 would adjust ascillator 45 to 60 cycles, if such is desired, volume control 43 would serve to increase or decrease light intensity.

Light intensity may also be controlled automatically whereby the light intensity would be raised or lowered remotely, wirelessly in an inverse proportion to the available light from other sources. Switch 44 is switched to A position and switch 51 to C position. Light sensitive cell (LSC) 53 would have a light input from other sources and LSC 53 would be connected to auxiliary input 49. The same procedure and operation may be provided for heating or cooling apparatus in conjunction with an automatic thermostat. The same procedure may be followed in controlling other appliances automatically.

It should be noted that transistors 5, 6 may be replaced with relays, whereby relays would be enabled (put on and off) according to the frequency stemming from coil 10. Whereas one relay would be activated on the positive half of the cycle while the other relay would be released but would be activated at the negative half of the cycle forming a push-pull signal same as stages 5, 6.

Note that a circuit may be connected through a relay without the use of transformers. This situation is provided whereby relay 86 is connected to coil 85. When a 60 cycle pulse signal is present at coil 85, it will likewise activate relay 86 60 times per second. One AC wire is connected to appliance 87 and a second AC wire is connected to appliance 87 through relay 86's contact. Therefore, when armature of relay is released current is cut off, providing thereby 60 pulses of power when pulser 89 is switched to on by switch 96, with pulses increasing or decreasing proportionately to the increase or decrease of pulser 89 in conjunction with stage 45. The above may be achieved remotely, wirelessly. For DC pulses, switch 97 is set to on and switch 96 is set to off. Unconnected wires 88 are connected to AC or DC.

Electricity may be saved by connecting numerous appliances in parallel. For example, 87 and 89 being two light bulbs. A distributor (not shown) may also provide scheduled activation of numerous appliances and filter capacitors connected in parallel over the input to the appliances would serve to maintain finer levels of operation.

When using relays in lieu of transistors 5,6 the relay would be set so that its switches would be connected in the same manner as that of collectors to emmiters of transistors 5 and 6. The current input to activate the relay would stem from coil 9, whereby coil 9 would feed both relays in a manner in which would result in opposite phasing.

It should be noted that the present invention may also provide automatic adjustment of current to motor 1 during a "brown out" or during any voltage drop. This would be achieved whereby coils 2 and 3 would be connected thus providing an output of 220 volts; volume control would be lowered so as to provide an operating level equivalent to the operating level provided by 110 volts. Similarly, automatic takeover is provided thereby upon a power cut off, with another power supply.

Note also, that an example or programming would be whereby a user would program a tape with multiple channels to bake a complete cake, as follows: First a plurality of frequency and/or amplitude and/or phase and/or pulse signals would activate selenoids whereby it would open the door to pour in the ingredients into the mixer from a deposit over it. Second: A second 1 channel signal would control the speed and duration of mixing.

Programming a tape is done as follows: pick up coil 52 is placed on the motor section of the mixer (or other motor driven apparatus) so as to pick up and record the pulses. These pulses are recorded on tape via a tape recorder. When pulses are played back via auxiliary 54, the mixer connected in place of motor 1 would be controlled through FIG. 1. The exact sequence of operations and speed as well as the duration of speed of the motor will be controlled duplicating the action as when the original cake was made.

Recording making use of other kinds of energy may similarly be made with the appropriate receiving means, such as a light sensitive cell for light recording, a thermistor for heat and so on.

Note, mixer should be kept at top speed at "playback." Volume control 43 could be adjusted to vary the overall function of the tape signal, if desired.

For controlling gas ovens or devices that are not run by electricity, solenoids that open or shut a valve by electronic signals may be employed, whereby the coil controlling the valve is connected in place of motor 1. Thus a tape would control the valve's actions.

To program the tape, a thermoresistor placed into the oven and plugged into auxiliary 49 thereby increasing or decreasing the signal of signal creator 45 and recording same on tape whereby the tape recorder is put into auxiliary 95, the recording auxiliary.

When the playback signal is fed into auxiliary 54, this will control the solenoid controlling the oven when it is in place of motor 1, so as to operate as when originally baked.

Any type of signal is created by simply recording the action during the original actions, since the original actions and all its changes were recorded, the playback would simply follow in the same steps.

For recording many different functions e.g. changes of a light and/or changes of a motor and/or changes of heating devices and so on, different channels would be used for recording each apparatus or device, or by using different types of signals such as frequency changes for one apparatus, amplitude for another and so on.

The signal of a video camera may also be recorded for use in controlling in the same manner as for audio, whereby the video signal would be recorded on video tape, the tape replayed to control a machine that would duplicate the patterns of the video image. Of course, the video signal speed would be reduced greatly so that it could drive one or more motors. Knitting machines, for example, would knit an image that would adhere to the video image. The motors controlling the knitting would operate at their own pace. However, they would be controlled by similar units of FIG. 2 whereby each motor would be in place of motor 1.

It should be noted that in regard to programming a tape for duplicating a cake by recording the pulses of the mixer, discussed previously, at the same time when recording the signal of one mixer, this mixer can control many other mixers so that when a user using the first mixer sees a malfunction in mixing speed, for example, can change the speed at the first mixer (the recording mixer) thereby resulting in the changing of speed remotely, though the other mixers may be out of sight.

This is done by connecting all the mixers to be controlled to coil 2 of one or more of FIG. 2 and plugging in the first (recording mixer) into auxiliary 54 in FIG. 1.

Note also, that output auxiliary 95 is special in a sence that it creates a signal for appliances that have no signal of their own. An example was given above with an oven. To further clarify the operation of output auxiliary 95, the following may be said:

Auxiliary input 49 also acts as a modulator for oscillator 45 so that when a signal is placed into auxiliary 49, and oscillator 45 is tuned on the input signal, this will cause a fluctuating difference in the signal of the oscillator. Note, switch 44 is kept at center off position for best results of above.

In the example of the oven, the termistor or other heat sensitive device is plugged into auxiliary 49. This would for example feed a 60 cycle signal from oscillator 45. When the temperature rises, this would cause a higher amplitude 60 cycle signal to be recorded on tape, while when the temperature lowers, this would cause a lower amplitude 60 cycle signal on the recording tape thereby creating a tape signal. The same would hold true when using a different frequency.

Another method: the heat sensor would be connected to oscillator 45 so as to change its frequency, thereby, when the heat rises a higher amplitude frequency is being recorded from auxiliary 95, while when heat is lowered the frequency is lowered thus the tape recording would then reproduce the same signal so to control an appliance in the manner of operation as when it was first recorded.

Note, tone control of oscillator 45 could be used if a desired limit high frequency playback is desired for fine changes in high class motors or fine relays.

Note that a microphone can also be used for recording sound of a machine and plugged into auxiliary 49 or 54, thereafter playing the recording back for controlling.

Perhaps, the greatest difference between the present invention and remote controls of prior art lies in the fact that while previous remote controls were generally designed to control the unit they were designed for, the present invention can control any appliance or device.

A good example of this: with previous remote controls designed to control a motor having certain specifications would not be capable of controlling a motor having different specifications without radical changes.

Moreover, should motors manufactured in the future be such that 60 cycle house current could not operate the motor, instead signals created by solid state circuitry. Previous remote controls would be rendered useless for such motors.

Not so for the present invention. Simply by adjusting oscillator 45 (the signal creator) so as to accommodate the signal at output coil 2,3 in FIG. 2 would be sufficient. New parts need not be added.

It should be noted that pick up coil 52 may be placed near an operating telephone whereby the phone would be used by a person at a remote location to transmit a controlling (60 cycle signal e.g.) signal and thereby controlling an apparatus remotely wirelessly and/or to change the operating function of an apparatus by feeding the required amplitude and/or frequency and/or phase and/or pulse signal so as to operate the machine. For example, to receive a recorded message from an answering machine via the telephone at a remote location whereby changing the amplitude of a signal fed into the telephone speaker thereby activating the play function, for example, and by changing the amplitude would activate the record function.

Similarly with motors, whereby changes in the frequency, amplitude, pulse may cause a motor to be controlled. By using meters 90, 91, 92, measuring frequency, amplitude, phase, pulse, thereby enabling the user to predict the action of the motor.

We claim:

1. A remote control system comprising one or more control apparatus for manually and automatically selecting at least one function and controlling or varying said function of one or more AC and DC electrical apparatus and non electrical apparatus whereby said non electrical apparatus is controlled or varied via said electrical sensing means, said AC and DC apparatus and said electrical sensing means connected to a receiver, comprising, (a) a transmitter, including means for generating a carrier wave,
    (b) means for modulating said carrier wave with one or more subcarrier waves each conveying information relative to a specific function to be controlled or varied, and whereby enabling said function to be controlled from a plurality of inputs from remote areas,
    (c) means for controlling or varying said function by audio signal, light signal, and by the signal of electromagnetic signal pick up means,
    (d) auxiliary input jack means for the addition or mixing of auxiliary signals for controlling or varying said function, said auxiliary signals including baseband signals, recorded signals of an operating apparatus identical to that of said AC and DC apparatus and said electrical sensing means,
    (e) auxiliary output jack means for connecting a recorder for recording the signal generated by said identical apparatus and said electrical sensing means, said recorded signal used for controlling or varying said function,
    (f) means for receiving, tuning and demodulating said modulated transmitted signal to a resulting amplitude or phase or frequency or pulse or any combination baseband signal and for amplifying the said resulting signal whereby to drive said AC and DC apparatus and non electric apparatus to a desired level of operation; for automatic discontinuance of said operation when said transmitter is not in opertion; for selecting said function as a result of voltage changes, pulse changes, frequency changes, phase changes in the said baseband signal,
    (g) said remote selection, control or varying of said function achieved without direct connection of either said AC and DC apparatus or said sensing means to said control apparatus.

2. The remote control system of claim 1 wherein the said carrier wave and subcarrier wave are modulated as to frequency or amplitude or phase or pulse or as to any combination baseband signal.

3. The remote control system of claim 1 wherein said connected apparatus is a motor, and whereby an apparatus driven by said motor whereby controlling or varying the speed of said motor will control or vary the function of said apparatus.

4. The remote control system of claim 1 wherein the said controlled or varied function of said connected apparatus is heat production.

5. The remote control system of claim 1 wherein the said controlled or varied function of said connected apparatus is light production.

6. The remote control system of claim 4 whereby the said heat production is automatically adjusted, inversely proportional to the level of ambiant heat available from other sources.

7. The remote control system of claim 5 whereby the said light production is automatically adjusted, inversely proportional to the level of ambiant light available from other sources.

8. An apparatus of claim 1 whereby said control apparatus comprising,
   a. a first variable frequency oscillator connected to a tuner for selecting and generating a desired frequency signal.
   b. a first volume-tone control means and a first modulator, said volume control connected to said modulator whereby said modulator modulates a transmitter connected to said modulator for transmitting a signal and whereby said volume control controls the amplitude of said frequency signal,
   c. a first auxiliary input jack connected to said volume control, for the addition or mixing said auxiliary signals, including said recorded signal and said baseband signals,
   d. a first amplifying means connected to said first volume tone control means via switching means,
   e. an auxiliary output jack connected to said volume control to accomodate a recorder for recording the signal of said identical apparatus,
   f. a light sensitive cell and a magnetic pick up coil connected to said amplifier via switching means for providing a controlled frequency and phased signal,
   g. a second auxiliary input jack connected to said first amplifying means for the addition or mixing said auxiliary signals whereby enabling the control of said connected apparatus by signals emanating from recorders and baseband signals,
   h. a second volume control connected to and controlling said first modulator for increasing or decreasing the amplitude of a carrier wave.
   i. a third auxiliary input jack connected to said second volume control for controlling the said function from a second remote area,
   j. a radio receiver connected to said third auxiliary input jack for controlling a first said control apparatus by a second control apparatus whereby modulating said transmitter with said subcarrier via said radio receiver,
   k. a second variable oscillator connected to a third volume control and a second modulator for generating a modulated subcarrier signal,
   l. a tuner connected to said first variable oscillator for tuning said first variable oscillator
   m. a pulse oscillator connected to said first variable oscillator via switching means for generating a pulse signal,
   n. a meter connected to said first modulator and a meter connected to said first variable oscillator and a meter connected to said second variable oscillator for metering the output signal of said modulator and said first and second oscillators.

9. An apparatus of claim 1 wherein said receiver comprising,
   a. means for tuning and amplifying the said transmitted signal and whereby said modulator of said transmitter is wired to said receiver,
   b. a demodulator at said receiver connected to first amplifying means for demodulating the carrier wave from the baseband signal,
   c. a first auxiliary input jack at said receiver for inducting the said baseband signal to said receiver for controlling the said function by baseband signal whereby said baseband signal is directly connected to said receiver via said first auxiliary input jack,
   d. second signal amplifying means at said receiver connected to said demodulator for amplifying the said baseband signal thereby empowering the said baseband signal to drive a power amplifier,
   e. a third signal amplifying means at said receiver for converting said amplified signal to a high output signal and for feeding said high output signal to said connected apparatus via connected circuitry,
   f. means comprising circuitry means and relays at said receiver for selecting said function as a result of said voltage changes, pulse changes, frequency changes, and phase changes in the baseband signal,
   g. a relay coil at said receiver connected to the output of said second amplifying means for controlling said function whereby said connected apparatus is connected to a power supply via said one or more relays.

10. An apparatus of claim 8 wherein the said control apparatus remotely controls one or more relays whereby said relays provide AC or DC pulses to one or more of said connected apparatus whereby the said connected apparatus is connected to an AC or DC power supply through said one or more relays.

11. An apparatus of claim 1 wherein means is provided to control said function of said non electrical apparatus whereby the said non electrical apparatus is connected to said receiver by connecting said electrical sensing means to said non electric apparatus and the said electrical sensing means is connected to said receiver and is controlled by a signal stemming from electronic equipment, from said control apparatus, and from said recorded signal, and whereby said electric apparatus and said non electric apparatus are controlled via said electrical sensing means by signals emanating from at least one said non electrical apparatus whereby said electrical sensing means is connected to said auxiliary input jack thereby creating a control signal for controlling or varying said non electrical and electrical apparatus.

12. An apparatus of claim 9 wherein means is provided to control or vary said function of an electrical apparatus connected to said receiver whereby a feedback signal is fed back to sid auxiliary input jack of said receiver whereby the said function of said connected electrical apparatus is controlled by signals of said identical electrical apparatus as that of said connected electrical apparatus and whereby said connected electrical apparatus is controlled by baseband signal and said recorded signal fed into said auxiliary input jack of said receiver.

* * * * *